United States Patent
Bogokovsky et al.

(10) Patent No.: US 12,445,472 B2
(45) Date of Patent: Oct. 14, 2025

(54) DETECTING SUSPICIOUS DATA ACCESS BY A ROGUE CLOUD RESOURCE

(71) Applicant: MICROSOFT TECHNOLOGY LICENSING, LLC, Redmond, WA (US)

(72) Inventors: Evgeny Bogokovsky, Herzliya (IL); Ram Haim Pliskin, Rishon lezion (IL); Andrey Karpovsky, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 224 days.

(21) Appl. No.: 18/146,796

(22) Filed: Dec. 27, 2022

(65) Prior Publication Data
US 2024/0137376 A1    Apr. 25, 2024

Related U.S. Application Data

(60) Provisional application No. 63/418,950, filed on Oct. 24, 2022.

(51) Int. Cl.
*H04L 9/40* (2022.01)
*G06F 21/55* (2013.01)

(52) U.S. Cl.
CPC ........ *H04L 63/1425* (2013.01); *G06F 21/554* (2013.01); *H04L 63/102* (2013.01); *H04L 63/1416* (2013.01)

(58) Field of Classification Search
CPC .......................... H04L 63/1425; H04L 63/102
See application file for complete search history.

(56) References Cited

U.S. PATENT DOCUMENTS 9,288,193 B1 *  3/2016 Gryb ................. G06F 21/44
2012/0311344 A1 * 12/2012 Sabin ............... G06F 9/45533
                                                            718/1
2014/0114786 A1 *  4/2014 Yan ..................... G06Q 20/02
                                                            705/26.1

(Continued)

OTHER PUBLICATIONS

International Search Report and Written Opinion received for PCT Application No. PCT/US2023/033417, Jan. 30, 2024, 12 pages.

(Continued)

*Primary Examiner* — Linglan Edwards
*Assistant Examiner* — Saron Matthewos Worku
(74) *Attorney, Agent, or Firm* — David Foster; Newport IP, LLC

(57) ABSTRACT

The techniques disclosed herein prevent a rogue resource from being created within a cloud computing environment. For example, a rogue serverless function may be prevented from integrating with a cloud-based database, thereby preventing the serverless function from performing malicious operations such as low-rate data exfiltration. The rogue serverless function is detected before it is installed, heading off the attack completely. In some configurations, a key retrieval request is received. Parameters of the key retrieval request are analyzed for anomalies, and anomalous key retrieval requests are stored in a pool. Then, when a request to create a resource is received, the pool of anomalous key retrieval requests is searched for a match. When a match is found, the resource creation request may be suspended pending a further security review.

20 Claims, 10 Drawing Sheets

(56) References Cited

U.S. PATENT DOCUMENTS

| | | | |
|---|---|---|---|
| 2019/0312899 A1* | 10/2019 | Shulman | H04L 63/1425 |
| 2020/0213338 A1 | 7/2020 | Lotem | |
| 2020/0402058 A1* | 12/2020 | Zhou | G06Q 20/385 |
| 2021/0352136 A1* | 11/2021 | Dojka | H04L 67/34 |

OTHER PUBLICATIONS

"Detect malicious activity using Azure Security Center and Azure Log Analytics", Retrieved from: https://azure.microsoft.com/en-us/blog/detect-malicious-activity-using-azure-security-center-and-azure-log-analytics/, May 17, 2018, 13 Pages.

Bjerke, et al., "Detect Rogue DHCP Server", Retrieved From: https://web.archive.org/web/20220322195124/https://docs.splunksecurityessentials.com/content-detail/detect_rogue_dhcp_server/, Mar. 22, 2022, 2 Pages.

"How to use KeyVault secret for Logic App SQL Connection String", Retrieved From: https://stackoverflow.com/questions/71161331/how-to-use-keyvault-secret-for-logic-app-sql-connection-string, Feb. 17, 2022, 6 Pages.

Curwin, et al., "Tutorial: Detect suspicious user activity with UEBA", Retrieved From: https://learn.microsoft.com/en-us/defender-cloud-apps/tutorial-suspicious-activity, Nov. 21, 2022, 8 Pages.

Fan, et al., "Connect to an SQL database from workflows in Azure Logic Apps", Retrieved From https://learn.microsoft.com/en-us/azure/connectors/connectors-create-api-sqlazure?tabs=consumption, Nov. 1, 2022, 19 Pages.

Opris, Elena, "Monitor Network Connections on Your PC to Detect Rogue Applications", Retrieved from: https://www.softpedia.com/blog/monitor-network-connections-on-your-pc-to-detect-rogue-applications-505286.shtml, Jun. 15, 2016, 4 Pages.

International Preliminary Report on Patentability (Chapter 1) received for PCT Application No. PCT/US2023/033417, May 8, 2025, 07 pages.

* cited by examiner

DETECTING SUSPICIOUS DATA ACCESS BY A ROGUE CLOUD RESOURCE

CROSS-REFERENCE TO RELATED APPLICATIONS

The present application is a non-provisional application of, and claims priority to, U.S. Provisional Application Ser. No. 63/418,950 filed on Oct. 24, 2022, the contents of which are hereby incorporated by reference in their entirety.

BACKGROUND

Cloud computing platforms offer a number of resources such as cloud-based storage, virtual machines, databases, serverless functions, etc. Cloud computing resources are secured from unauthorized access with credentials such as passwords and biometric data. Cloud computing resources are also monitored for suspicious activity such as an access attempt from an unexpected IP address or a prolonged spike in network traffic caused by unauthorized data exfiltration.

However, instead of crudely exfiltrating large amounts of data in a suspicious manner, an attacker that gains access to a user's account may create a rogue resource that slowly and imperceptibly performs malicious operations over time. For example, a rogue serverless function may be configured to modify the values of financial transactions as they occur. Once installed, a rogue resource operates on behalf of the user, and as such is difficult to distinguish from resources that were legitimately created by the user. Operating within the cloud computing service also renders IP address-based security measures ineffective.

Another drawback to existing techniques for identifying malicious behavior is a tendency to identify the behavior after it has happened. Although better than not detecting the behavior at all, even a partially completed attack may cost users time, money, or reputation. For example, if an exfiltration attack is halted half-way, a significant amount of sensitive data may have already been obtained.

It is with respect to these and other considerations that the disclosure made herein is presented.

SUMMARY

The techniques disclosed herein prevent a rogue resource from being created within a cloud computing environment. For example, a rogue serverless function may be prevented from integrating with a cloud-based database, thereby preventing the serverless function from performing malicious operations such as low-rate data exfiltration. The rogue serverless function is detected before it is installed, heading off the attack completely. In some configurations, a key retrieval request is received. Parameters of the key retrieval request are analyzed for anomalies, and anomalous key retrieval requests are stored in a pool. Then, when a request to create a resource is received, the pool of anomalous key retrieval requests is searched for a match. When a match is found, the resource creation request may be suspended pending a further security review.

To install a rogue cloud resource that integrates with a target cloud resource, the attacker first acquires a key that grants access to the target cloud resource. To do this, the attacker logs in to the user's account and retrieves the key from an administrative server. The attacker may retrieve the key programmatically. Additionally, or alternatively, the attacker may manually login to the user's account and manually retrieve the key by navigating a graphical user interface (GUI). The retrieved key may be stored for future use.

The attacker then creates the rogue cloud resource, such as a serverless function that slowly exfiltrates data. In order to interact with the target resource, the attacker configures the rogue resource with the key. The rogue resource may then use the key to inspect or modify the target resource. For example, the rogue resource may use the key to periodically perform some operation on the target resource, such as encrypting a file. As with retrieving the key, the attacker may create the rogue cloud resource programmatically or manually.

The attacker may also use the key to register the rogue resource to receive events published by the target resource. For example, the rogue resource may receive an event every time a row is updated in a database. Upon receiving an event, the rogue resource will have the opportunity to take some action, such as modifying the value stored in the updated row.

Cloud service application program interfaces (APIs) are monitored in order to intercept the creation of a rogue cloud resource. In some configurations, key retrieval APIs and resource creation APIs are monitored for suspicious usage. However, key retrieval APIs are commonly invoked in legitimate circumstances, and so distinguishing malicious key requests from legitimate requests is challenging. For example, the legitimate user may invoke a key retrieval API to obtain a key, and then use that key with a serverless function to ensure that values stored in a database are within defined limits. Resource creation APIs are not as common as key request APIs.

In some configurations, suspicious cloud resource creation requests are identified by correlating key retrieval and resource creation requests. For example, a key retrieval request may be correlated with a resource creation request if both requests are associated with the same subscription and are both made by the same user. In some configurations, when a suspicious key retrieval request and a corresponding resource creation request is identified, the resource creation request is blocked pending confirmation that the requests are legitimate. This ensures that the rogue resource is not installed or activated.

In some configurations, a legitimate user will perform a key retrieval request hundreds or thousands of times a day, or more. From this history a profile of user interactions is generated. The profile may include parameters of cloud service requests such as key retrieval requests. For example, the profile may store the originating IP address, geographical location, username, type of authentication (e.g. username and password, multi-factor authentication including the specific types of factors), the time of day, whether permission to access the resource is assigned to the individual user or due to the user's membership in a group that has permission to access the resource, the name or identifier of the resource the key retrieval request pertains to, etc. The profile may also store parameters that are specific to the type of the requested resource.

Then, when a particular request is received, the parameters of the particular request may be analyzed in light of the profile to generate an anomaly score. If the anomaly score is greater than a defined threshold the request is determined to be suspicious. One technique for generating an anomaly score is to train a machine learning model on the parameters stored in the profile. The trained model may then be used to infer an anomaly score based on the parameters of the particular key retrieval request.

For example, in response to a key retrieval request, the profile may be analyzed to determine that the user typically requests a key using a specific application from a specific IP address at that specific time of day. If the request comes from an unrecognized IP address, then the request may be identified as suspicious. If the request comes from an individual with standalone permissions when requests typically are granted access based on group permissions, the request may be identified as suspicious. In some configurations, if a key retrieval request is deemed suspicious it is placed into a pool of suspicious events.

Resource creation operations tend to be rare. As such, in some configurations, when a resource creation operation is deemed to correlate with a suspicious key retrieval request, the resource creation operation is itself determined to be suspicious. A suspicious resource creation request may be suspended or denied outright. In some configurations, the resource creation request is determined to be correlated with a key retrieval request by searching through the pool of suspicious key retrieval requests. For example, correlation may be determined if the same user under the same subscription performed the key retrieval request and the resource creation request. Other correlations based on other parameters or combinations of parameters are similarly contemplated. As referred to herein, a subscription is a collection of cloud assets that are used by a particular organization, or a particular sub-group within an organization.

One example of a potentially rogue cloud resource is a cloud service that executes code. Examples include serverless functions and virtual machines. Another example is an AZURE logic app, which performs tasks but is configured using a graphical user interface (GUI) instead of writing code. In some configurations, executable cloud services use connectors to integrate with other cloud computing resources. For example, connector sub-resources may be added to a logic app in order to integrate with other cloud-based resources. For instance, a database connector may be added to receive events from a database, such as indications that a row of the database has been modified. In these configurations, the creation of the connector may also be rare—similar to how logic app creation is rare. In these configurations, a request to create a connector may itself be suspicious if the same user submitted a key retrieval request deemed suspicious. As with the request to create a resource, the suspicious request to create a connector may be suspended until the provenance of the requests are verified.

In some configurations, instead of exfiltration, an attacker may wish to modify data stored in the target cloud resource. For example, an attacker may want to encrypt the user's data as part of a ransomware scam. Or an attacker may change a financial ledger storing a bank balance or modify financial transactions as they are occurring. Or an attacker may alter machine learning training data so that a machine learning model learns the wrong lesson.

While databases are used as examples throughout this document, any type of cloud resource is similarly contemplated as a target resource. For example, cloud-based storage may be a resource targeted by an attacker. In this example, the attacker may attempt to exfiltrate data from the storage service, delete data, modify data, encrypt data, etc. Regardless of the type of cloud resource targeted by the attacker, the attacker will have to obtain a key to access the resource and create a rogue resource to manipulate it, and so the techniques discussed above are applicable to these other types of resources.

Similarly, while serverless functions such as AZURE logic apps are used as examples throughout this document, other types of execution resources such as containers and virtual machines are similarly contemplated. For example, an attacker may create a virtual machine with a service that periodically uses a key to maliciously access the target resource. In other scenarios, an attacker may hijack an existing virtual machine to inject code that uses a key to maliciously access the target resource.

As referred to herein, a key is a string of letters and numbers that grants its holder a privilege. One example of a key retrieval request is an AZURE "List Keys" request. On example of a cloud database is AZURE Cosmos DB— a distributed, multi-model database.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Instead of crudely exfiltrating large amounts of data in a suspicious manner, an attacker that gains access to a user's account may create a rogue resource that slowly and imperceptibly performs malicious operations over time. For example, a rogue serverless function may be configured to modify the values of financial transactions as they occur. Once installed, a rogue resource operates on behalf of the user, and as such is difficult to distinguish from resources that were legitimately created by the user. Operating within the cloud computing service also renders IP address-based security measures ineffective.

Another drawback to existing techniques for identifying malicious behavior is a tendency to identify the behavior after it has happened. Although better than not detecting the behavior at all, even a partially completed attack may cost users time, money, or reputation. For example, if an exfiltration attack is halted half-way, a significant amount of sensitive data may have already been obtained.

Figure 1A:
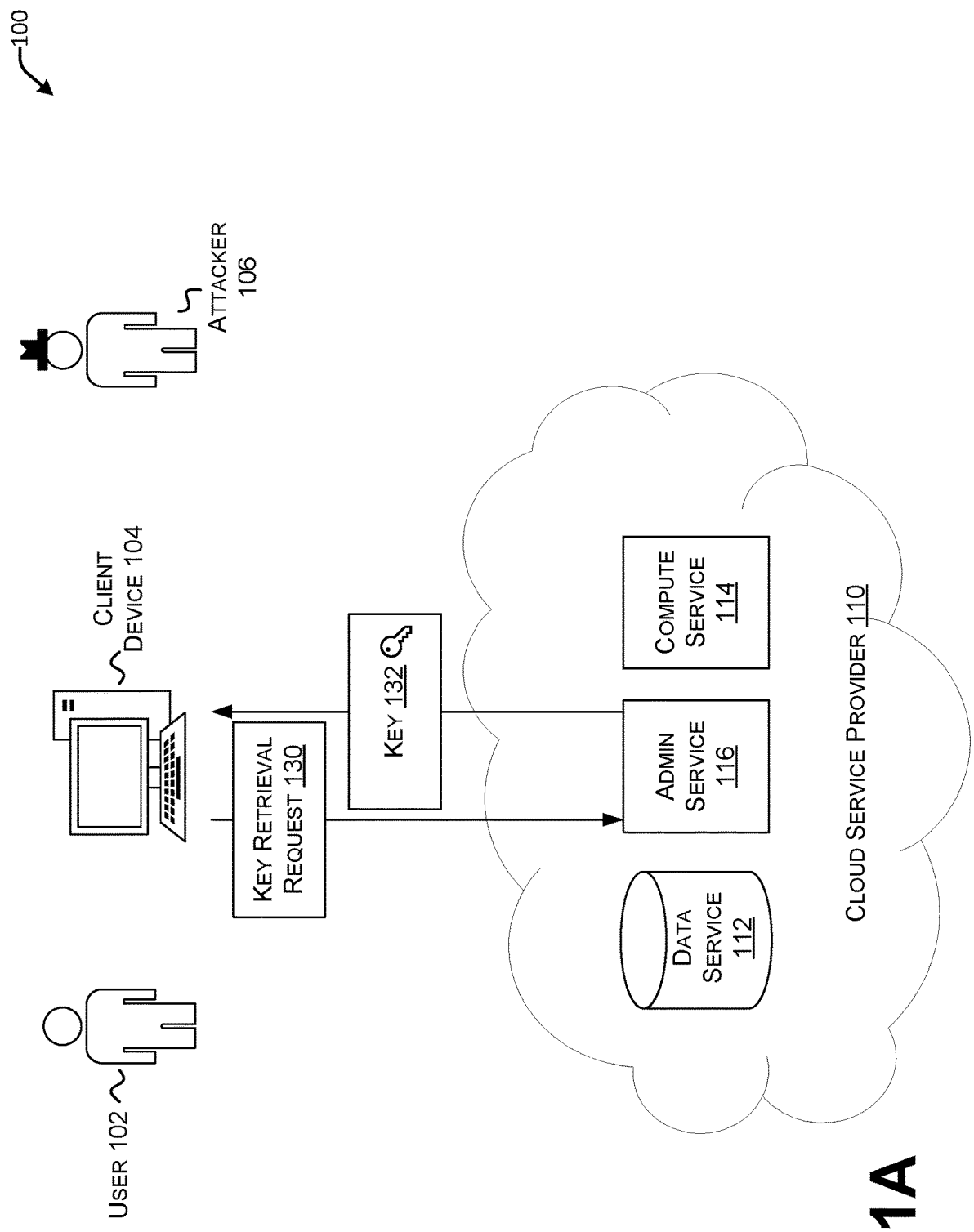
FIG. 1A illustrates retrieving a key from an administrative service.

FIG. 1A illustrates a key retrieval request 130 for retrieving a key 132 from an administrative service 116. User 102 operates client device 104 that initiates key retrieval request 130. Key retrieval request 130 is provided to administrative service 116 of cloud service provider 110. Administrative service 116 may validate the credentials and or biometric information of user 102 before granting the request. If user 102 has successfully logged in, administrative service 116 will return key 132 to client device 104.

Attacker 106 may acquire the login credentials of user 102. For the purposes of the disclosed embodiments, attacker 106 may use any means to acquire login credentials of user 102, including brute force hacking, phishing, stealing, etc. Data service 112 illustrates a cloud service that attacker 106 may attempt to access maliciously with the stolen credentials. Compute service 114 illustrates a service provided by cloud service provider 110 that attacker 106 may create or otherwise utilize in order to monitor and/or modify data service 112. Data service 112 may refer to a database, such as a relational database or a nosql database. Data service 112 may also refer to a cloud storage service, such as a BLOB storage service.

Figure 1B:
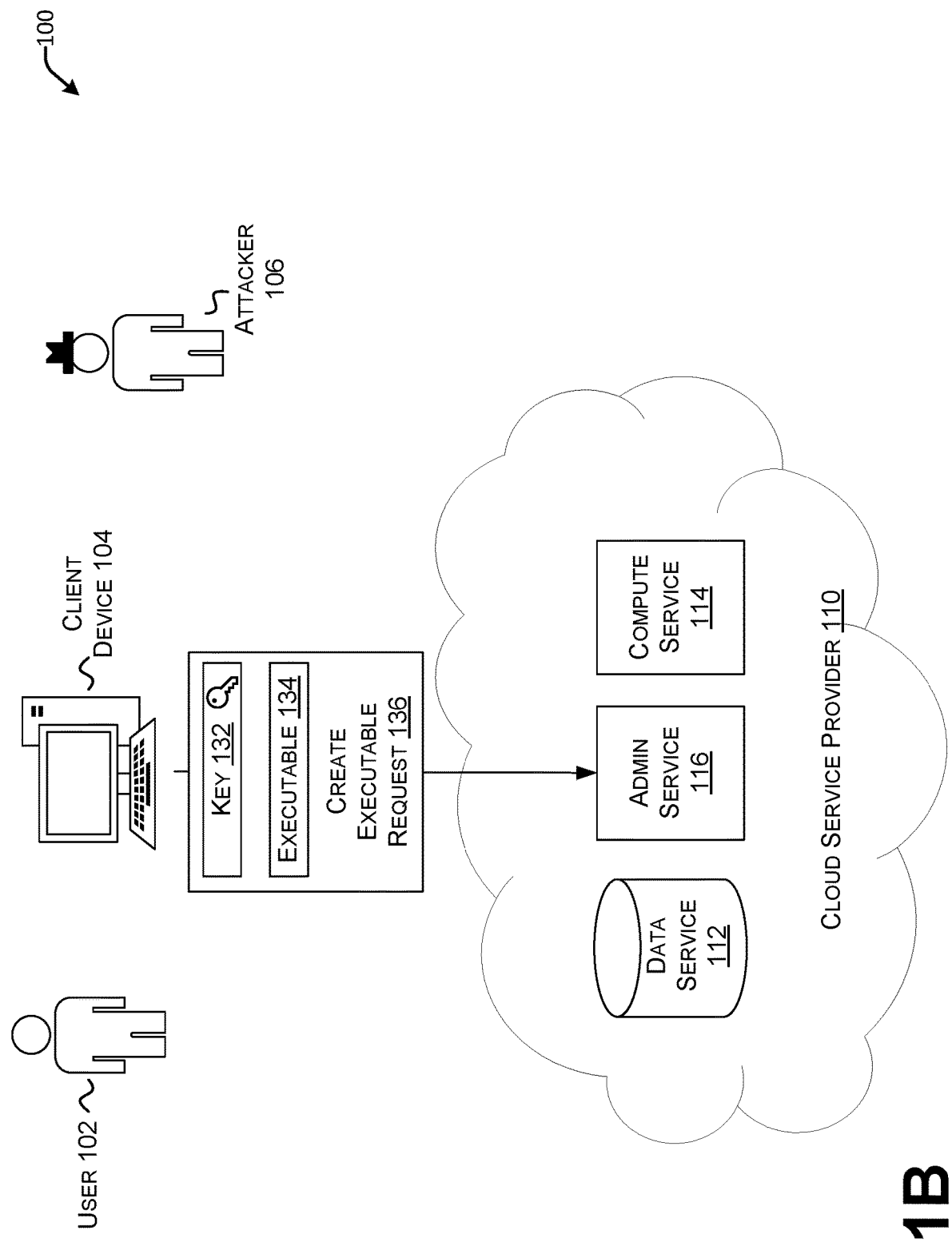
FIG. 1B illustrates using the requested key to request creation of an executable.

FIG. 1B illustrates using the requested key 132 to request creation of an executable 134. Create executable request 136 contains a copy of key 132 as well as executable 134. Administrative service 116 receives create executable request 136, storing executable 134 in compute service 114 where it may be run periodically or in response to an event raised by data service 112. In some configurations, key 132 is embedded in the compute service 114 created in response to create executable request 136 so as to be accessible by compute service 114 when attacking data service 112.

Figure 1C:
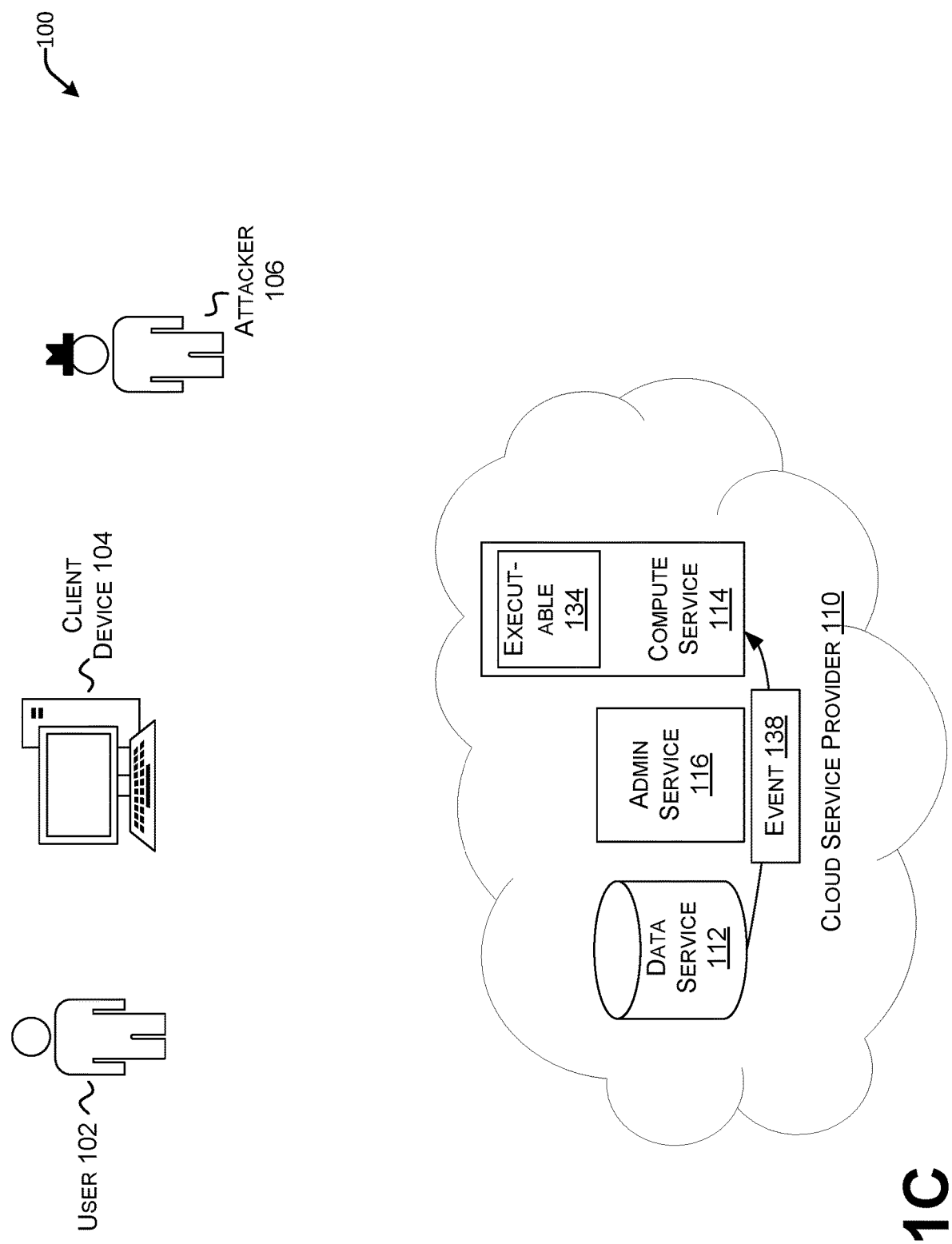
FIG. 1C illustrates providing an event generated by a data service to the executable.

FIG. 1C illustrates providing an event 138 generated by a data service 112 to the executable 134. Executable 134 may have registered with data service 112 to receive events like event 138. In some configurations, key 132 is used to register executable 134 to receive events from data service 112. Event 138 may trigger whenever a piece of data stored by data service 112 is added, changed, deleted, or otherwise modified. For example, event 138 may be triggered when a row is added to a database table, at which time executable 134 may modify the row, exfiltrate the data contained in the row, delete the row, or perform some other malicious task.

Figure 1D:
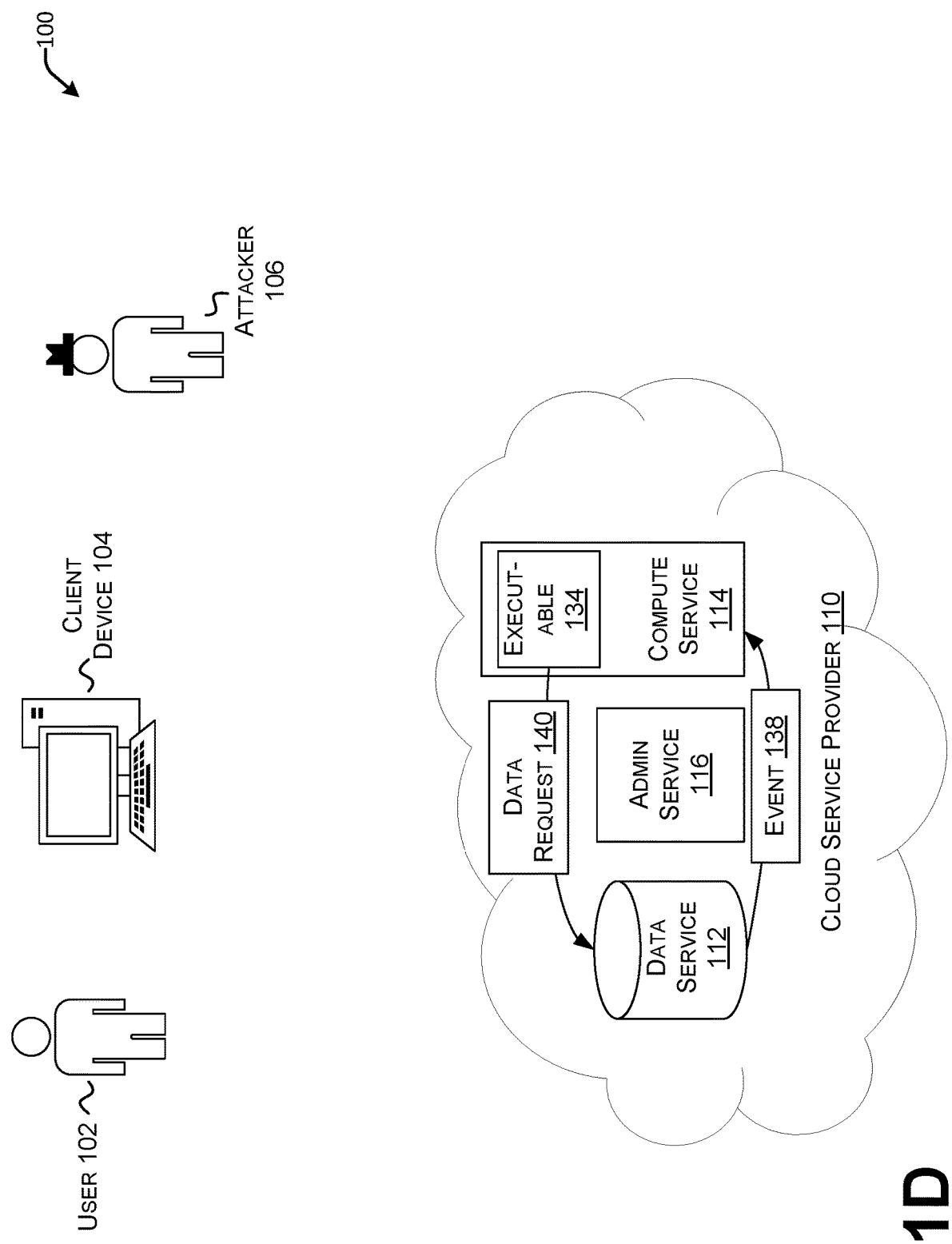
FIG. 1D illustrates the executable using the requested key to access, modify, or delete one or more rows in a data service.

FIG. 1D illustrates the executable 134 using the requested key 132 to access, modify, or delete one or more rows in data service 112. FIG. 1D is a continuation of FIG. 1C. Specifically, FIG. 1D illustrates one example of responding to an event raised by data service 112. For example, executable 134 may respond to event 138 by providing data request 140 to data service 112. For example, event 138 may indicate that a record in data service 112 was altered. Data request 140 may be provided to data service 112 to obtain a related record, delete the record, exfiltrate the record, or perform any other malicious operation. Executable 134 provides key 132 with data request 140.

Figure 1E:
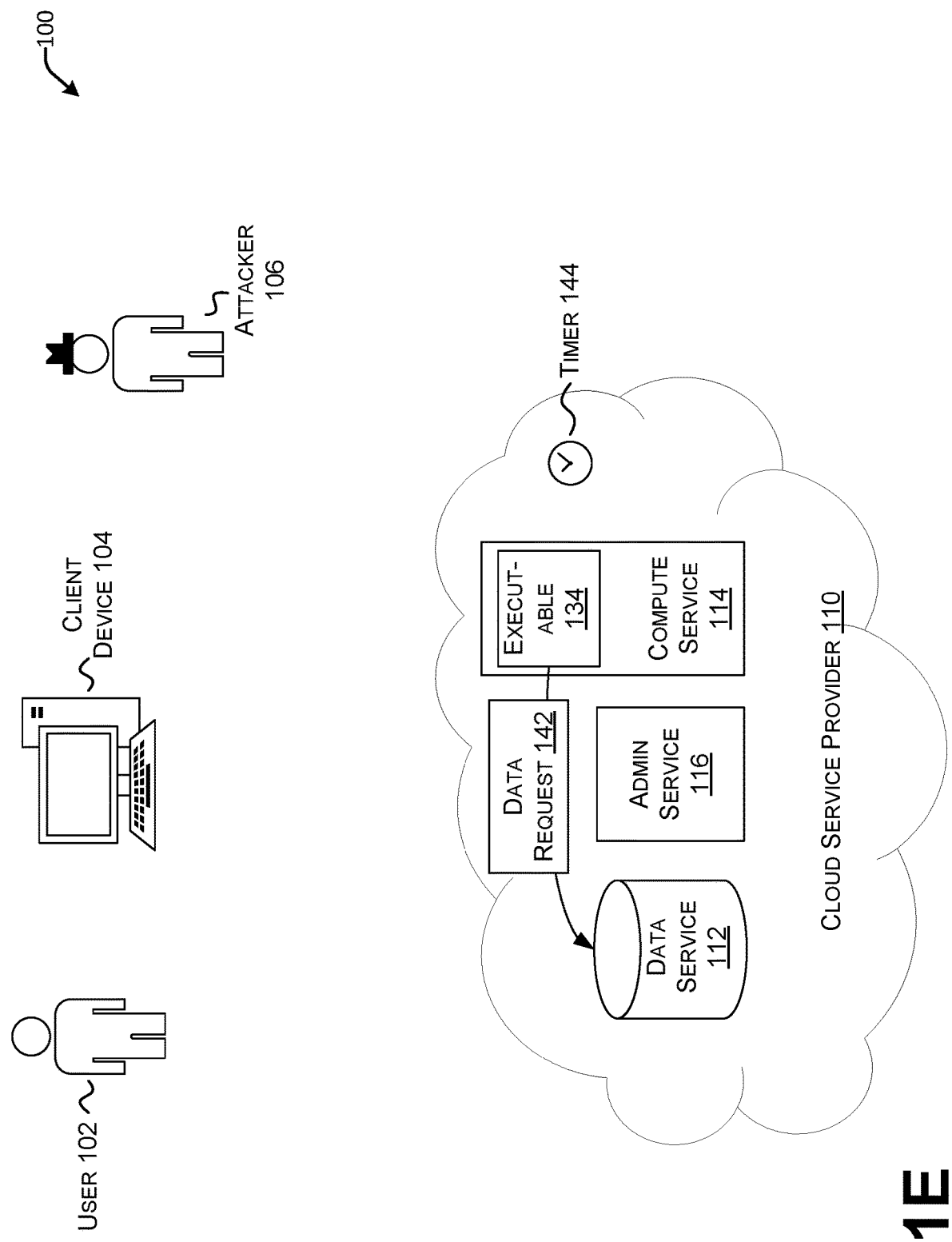
FIG. 1E illustrates the executable as triggered by a timer.

FIG. 1E illustrates the executable 134 as triggered by a timer 144. Instead of responding to an event such as event 138, a logic app or other executable service may be activated periodically and given the opportunity to do work. As illustrated, executable 134 periodically submits data request 142 to data service 112. When executable 134 is legitimate, data request 142 may be issued to periodically verify that a temperature remains within tolerances. When executable 134 is malicious, data request 142 may be part of a scheme to exfiltrate or encrypt data stored in data service 112 slowly enough to evade security measures that detect high volume operations.

Figure 2:
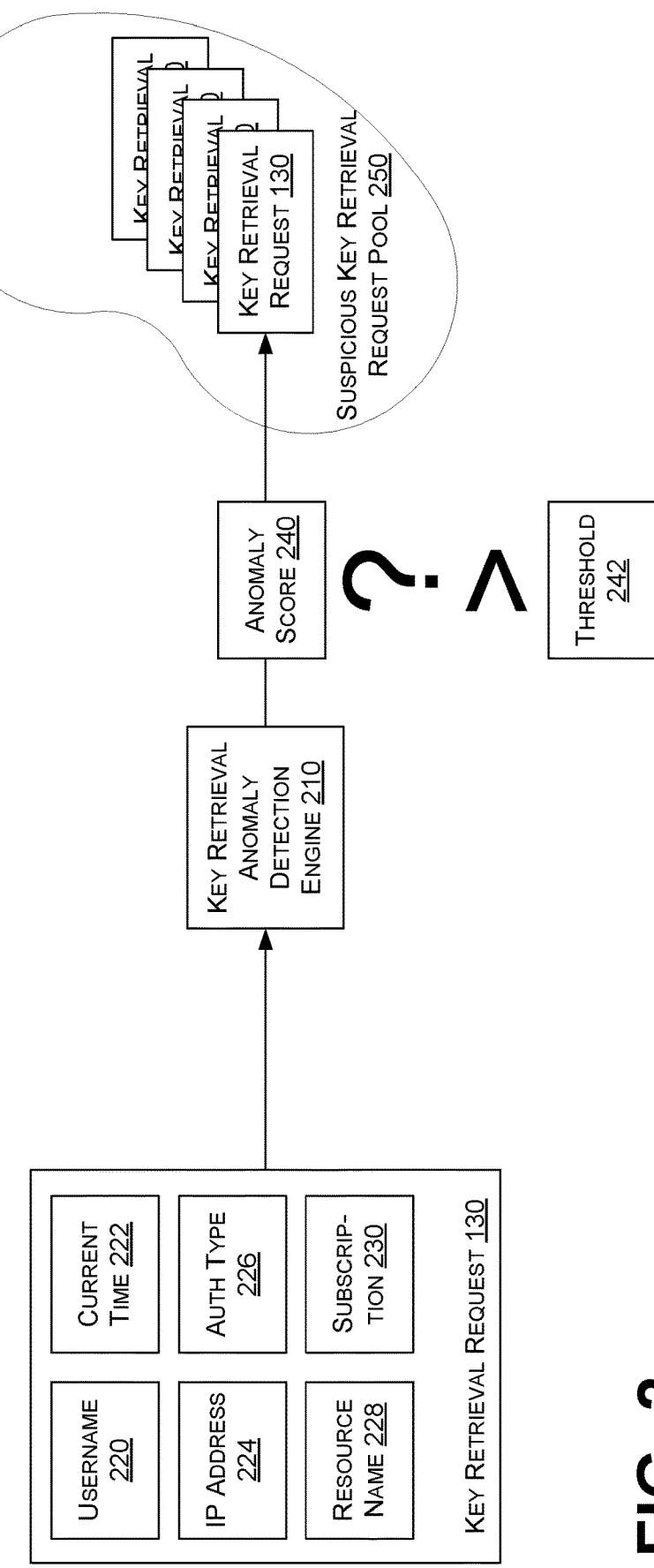
FIG. 2 illustrates determining whether a key retrieval request is anomalous.

FIG. 2 illustrates key retrieval anomaly detection engine 210 processing key retrieval request 130 to generate anomaly score 240. Key retrieval anomaly detection engine 210 may use a machine learning model to infer an anomaly score 240 from parameters 220-230. Specifically, username 220, current time 222, IP address 224, authentication type 226, resource name 228, and subscription 230 may be provided as inputs to key retrieval anomaly detection engine 210. Key retrieval anomaly detection engine 210 yields anomaly score 240 indicating how suspicious key retrieval request 130 is. Threshold score 242 is compared to anomaly score 240 to determine if key retrieval request 130 is suspicious. If anomaly score 240 is greater than threshold score 242, key retrieval request 130 is added to suspicious key retrieval request pool 250. Otherwise, key retrieval request 130 is allowed to be processed as normal.

Username 220 may be any user or group identifier or handle. Current time 222 may include a date, day of the week, time of day, or other time metric. IP address 224 may refer to the IP address of the device that is requesting the key, e.g. client device 104. IP address 224 may be used to derive a geographic location of the login request, such as the country, region, or municipality. The geographic location of the IP address may also be used to infer the time zone from which key retrieval request 130 was made. Resource name 228 refers to the cloud resource that the key will grant access to, e.g. cloud database 112. Subscription 230 refers a subscription name, domain name, or other group identifier that user 102 is a member of.

Figure 3:
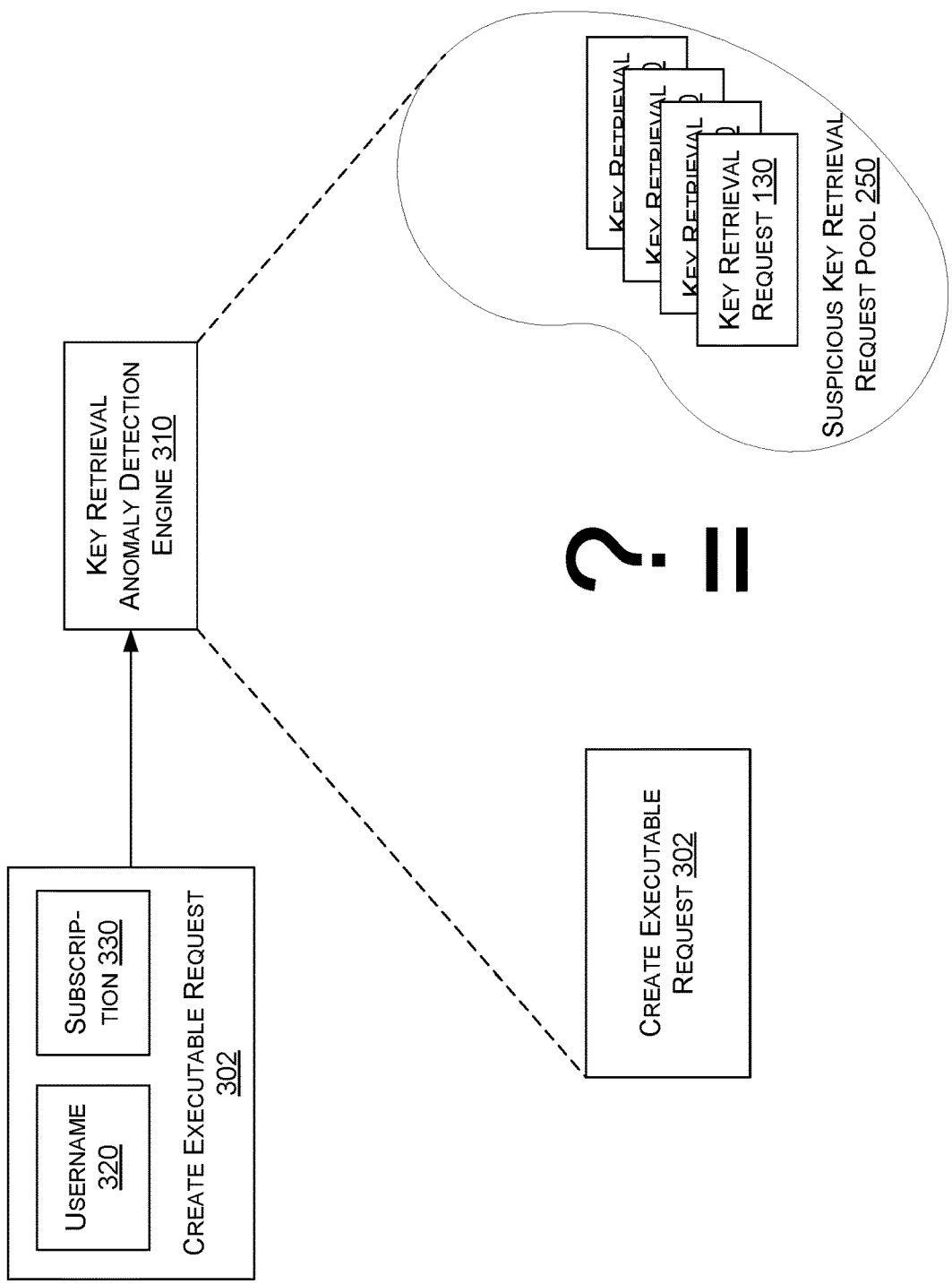
FIG. 3 illustrates determining whether a create executable request correlates to one of a pool of suspicious key retrieval requests.

FIG. 3 illustrates key retrieval anomaly detection engine 310 determining whether a create executable request 302 correlates with one of a pool of suspicious key retrieval requests 250. Specifically, key retrieval anomaly detection engine 310 compares username 320 and subscription identifier 330 to the usernames and subscription identifiers of the key retrieval requests stored in pool 250. Create executable request 302 is a comparatively rare event, and so the combination of two comparatively rare events—suspicious key retrieval request 130 and a create executable request 302—warrants further investigation. If a match is found, e.g., if usernames and subscriptions match, then the create executable request 302 is deemed suspicious based on the fact that it appears to be created by the same person who recently submitted a suspicious key retrieval request 130. As a result, key retrieval anomaly detection engine 310 may alert an administrator associated with the account and/or suspend creation of a potentially rogue cloud resource. Key retrieval anomaly detection engine 310 may suspend creation of the requested execution resource until the legitimacy of create executable request 302 is confirmed.

Other types of comparisons using other parameters are similarly contemplated, as is the degree of match required to determine if two requests are associated. For example, key retrieval anomaly detection engine 310 may compare usernames alone, without regard to subscription. Key retrieval anomaly detection engine may 310 may also factor in context of the create executable request 302, similar to the context 220-230 of key retrieval request 130. For example, parameters associated with create executable request 302 such as username, current time, IP address, authentication type (e.g., individual or group based), and subscription may be considered alone, together, or in comparison with the counterpart context of potential key retrieval request matches 130 in the suspicious key retrieval request pool 250. For example, key retrieval anomaly detection engine 310 may not suspend creation of the requested execution resource if the key retrieval request 130 and matching create executable request 302 originated from different IP addresses or different regions of the world. Key retrieval anomaly detection engine 310 may also consider how much time has elapsed between the key retrieval request 130 and the create executable request 302, e.g., not suspending creation of the requested execution resource if a week has passed between key retrieval request 130 and create executable request 302.

Figure 4:
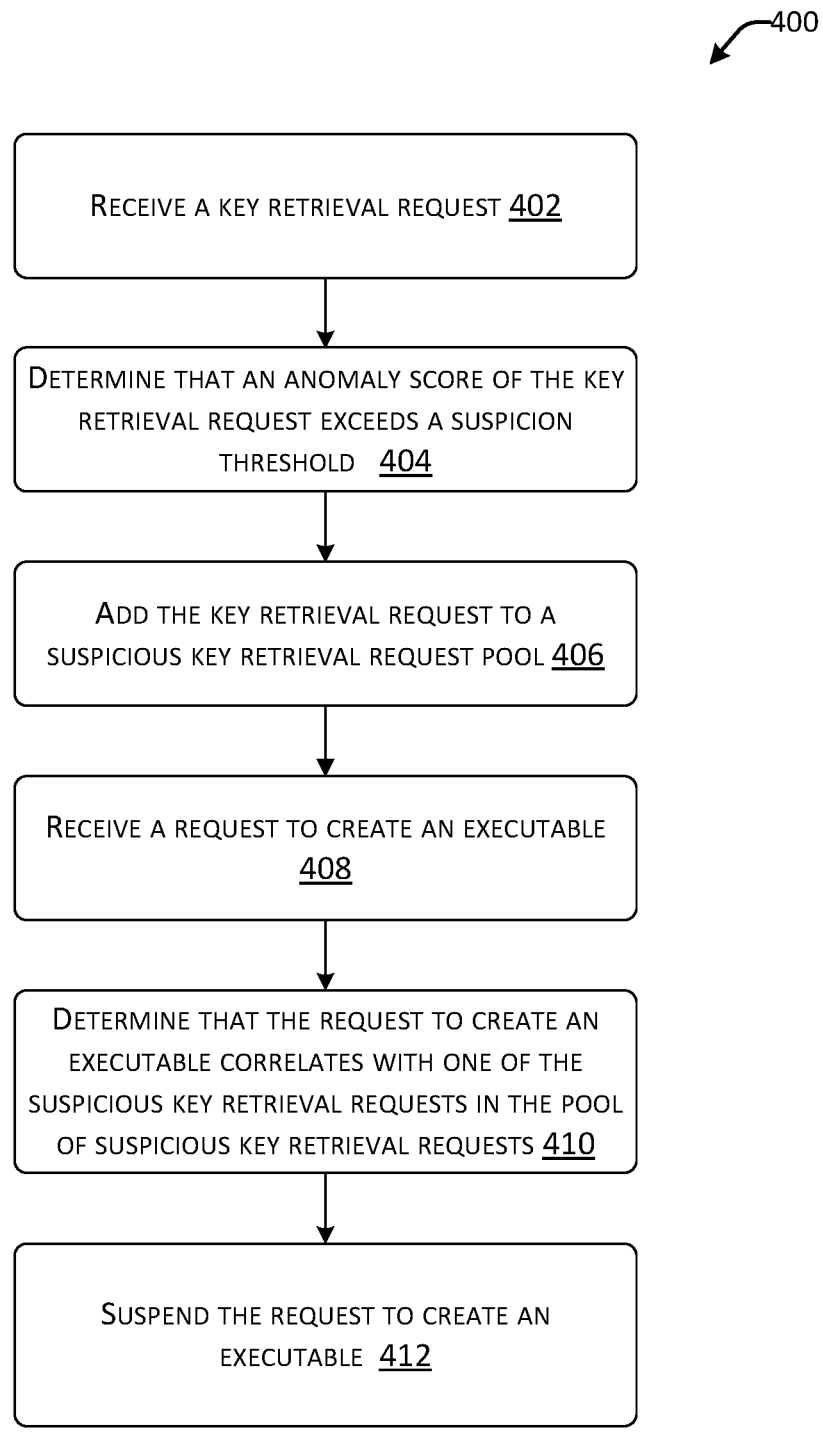
FIG. 4 is a flow diagram of an example method for detecting suspicious data access by a rogue cloud resource.

With reference to FIG. 4, routine 400 begins at operation 402, where a key retrieval request 130 is received by an administrative service 116 component of cloud service provider 110. One example of administrative service 116 is the AZURE control plane.

Next at operation 404, administrative service 116 determines whether an anomaly score 240 of the key retrieval request 130 exceeds a suspicion threshold 242.

Next at operation 406, administrative service 116 adds key retrieval request 130 to a pool of suspicious key retrieval requests 250.

Next at operation 408, the administrative service 116 receives a request to create an executable 136. Request to create an executable 136 includes the retrieved key 132. In this context, an executable refers to any cloud resource that provides computation, such as a serverless function, a logic app, a virtual machine, a container, etc.

Next at operation 410, the admin service 116 determines whether the request to create an executable 136 correlates with one of the pool of suspicious key retrieval requests 250.

Next at operation 412, the admin service 116 suspends the request to create an executable 136, preventing a potentially rogue cloud resource from being installed.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
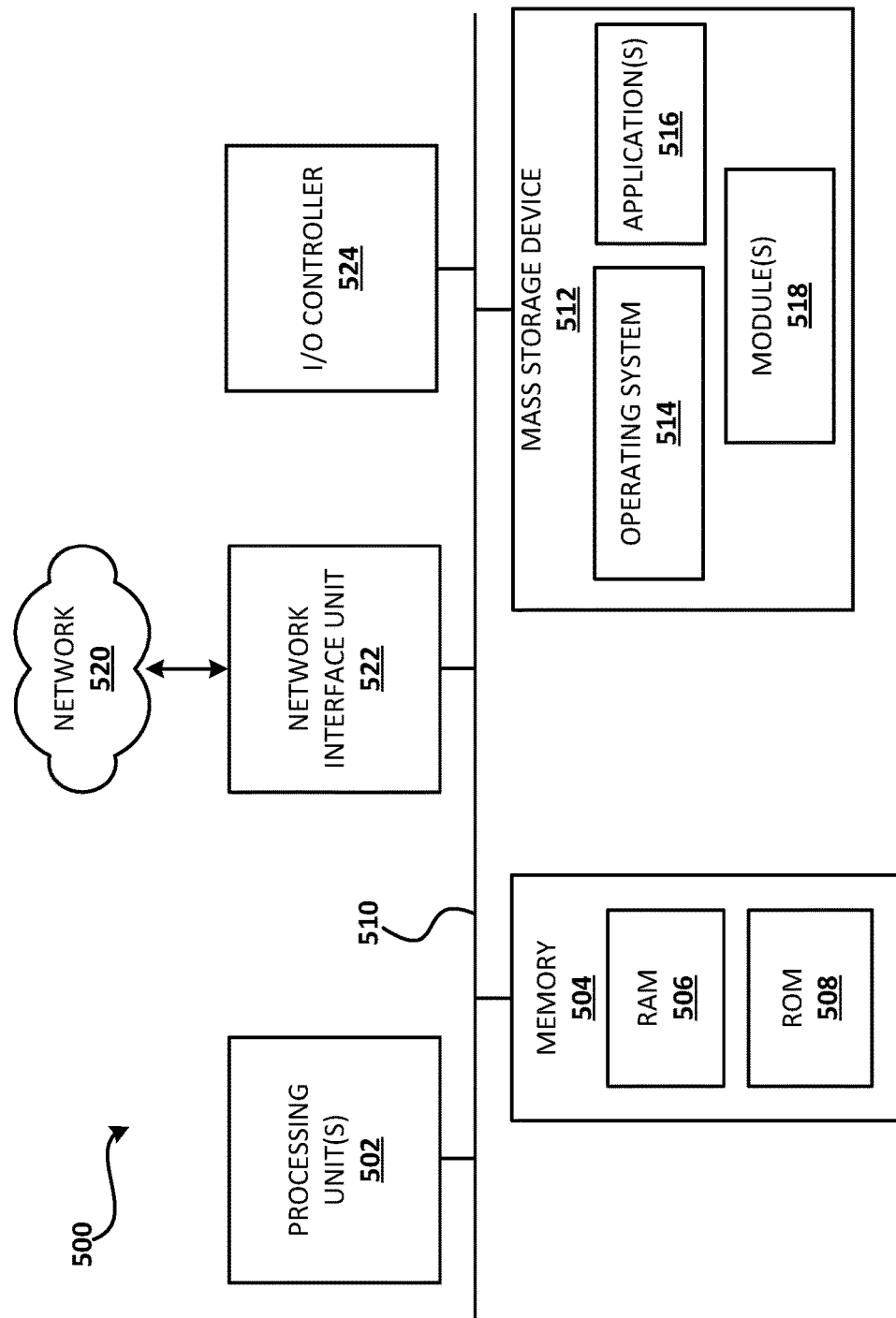
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
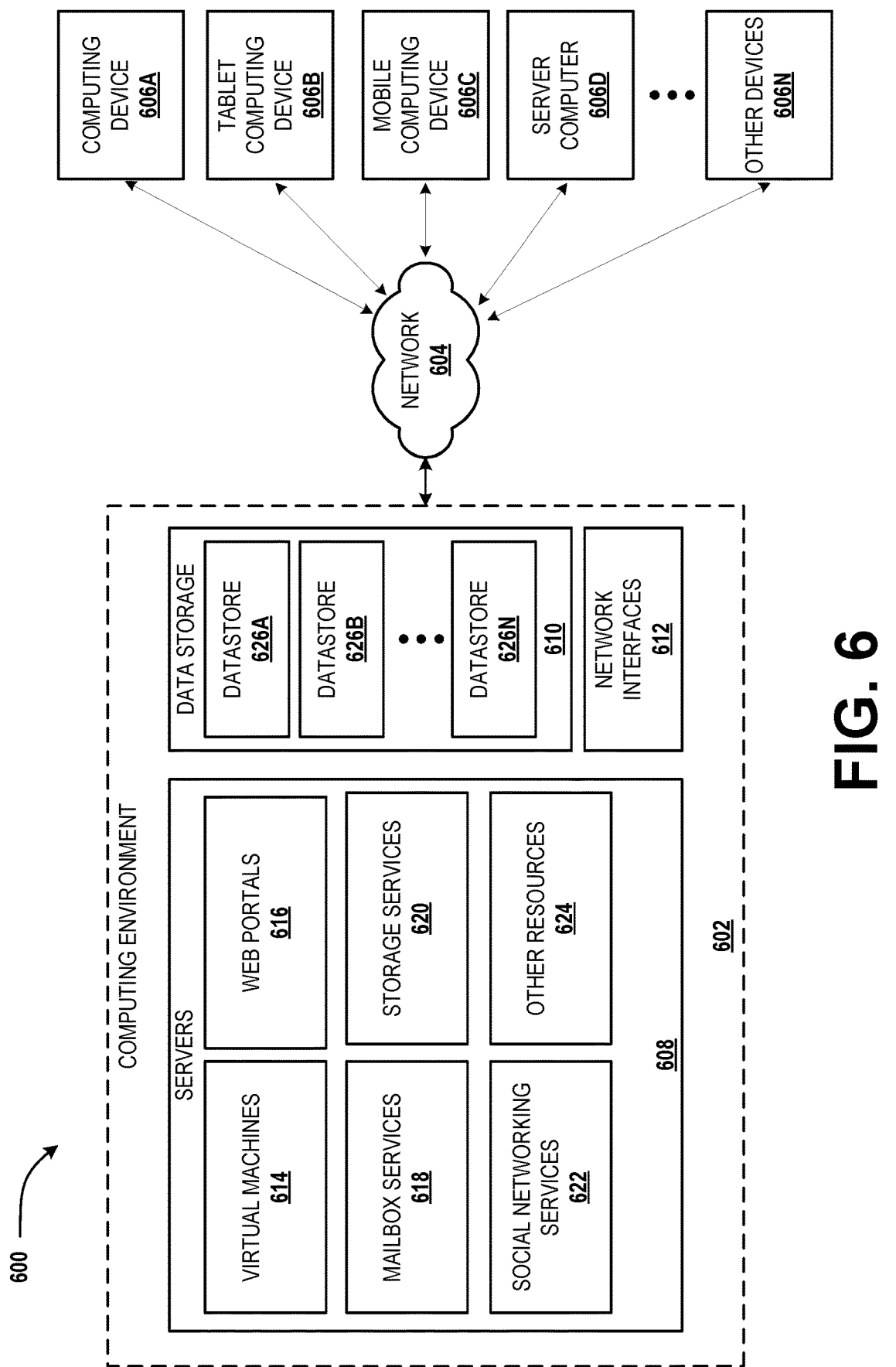
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or, social networking services 622. As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The present disclosure is supplemented by the following example clauses.

Example 1

A method comprising: receiving a key retrieval request; determining that an anomaly score of the key retrieval request exceeds a suspicion threshold; adding the key retrieval request to a pool of suspicions key retrieval requests; receiving a request to create an executable cloud resource; determining that the request to create the executable cloud resource correlates with one of the pool of suspicious key retrieval requests; and suspending the request to create the executable cloud resource.

Example 2

The method of Example 1, wherein the key retrieval request is made from a compromised user account, and wherein a key returned by the key retrieval request grants permission for a rogue cloud resource to be surreptitiously created.

Example 3

The method of Example 1, wherein a key returned by the key retrieval request grants permission to create an event that triggers a malicious executable cloud resource in response to an action taken by an existing cloud resource.

Example 4

The method of Example 3, wherein the action taken by the existing cloud resource comprises a creation, a modification, or a deletion of an entry in a cloud database.

Example 5

The method of Example 1, wherein the executable cloud resource comprises a logic app.

Example 6

The method of Example 1, wherein the key retrieval request and the request to create the executable cloud resource are determined to be correlated based on being made by a same user from a same cloud subscription.

Example 7

The method of Example 1, further comprising: generating a profile of cloud resource interactions made by a user; and computing the anomaly score based on a comparison of a context of the key retrieval request with the profile of cloud resource interactions.

Example 8

A computer-readable storage medium having computer-executable instructions stored thereupon that, when executed by a processing system, cause the processing system to: receive a key retrieval request; determine that an anomaly score of the key retrieval request exceeds a suspicion threshold; add the key retrieval request to a pool of suspicions key retrieval requests; receive a request to create an executable cloud resource; determine that the request to create the executable cloud resource correlates with one of the pool of suspicious key retrieval requests; and suspend the request to create the executable cloud resource.

Example 9

The computer-readable storage medium of Example 8, wherein the executable cloud resource comprises a serverless function cloud resource or code that executes on a virtual machine cloud resource.

Example 10

The computer-readable storage medium of Example 8, wherein the executable cloud resource is assigned an internet protocol (IP) address from a range of IP addresses associated with a cloud service provider that receives the key retrieval request and that receives the request to create the executable cloud resource.

Example 11

The computer-readable storage medium of Example 8, wherein a sub-resource of the executable cloud resource connects the executable cloud resource to a target cloud resource, and wherein a request to create the sub-resource is suspended based on a determination that the request to create the sub-resource correlates with one of the pool of suspicious key retrieval requests.

Example 12 the computer-readable storage medium of example 8, wherein the computer-executable instructions further cause the processing system to: generate a profile of cloud resource interactions made by a user; and compute the anomaly score based on a comparison of a context of the key retrieval request with the profile of cloud resource interactions.

Example 13

The computer-readable storage medium of Example 12, wherein the profile of cloud resource interactions is generated based on an originating IP address, a geographical location, a username, a type of authentication used to authenticate an individual user, a time of day, or whether permission to access a cloud resource was granted to an individual user or is derived from membership of the individual user in a group of users that has been granted permission.

Example 14

A processing system, comprising: a processor; and a computer-readable storage medium having computer-executable instructions stored thereupon that, when executed by the processing system, cause the processing system to: receive a key retrieval request; determine that an anomaly score of the key retrieval request exceeds a suspicion threshold; add the key retrieval request to a pool of suspicions key retrieval requests; receive a request to create an executable cloud resource; determine that the request to create the executable cloud resource correlates with one of the pool of suspicious key retrieval requests; and suspend the request to create the executable cloud resource.

Example 15

The processing system of Example 14, wherein the computer-executable instructions further cause the processing system to: generate a profile of cloud resource interactions made by a user; and compute the anomaly score based on a comparison of a context of the key retrieval request with the profile of cloud resource interactions.

Example 16

The processing system of Example 15, wherein the comparison of the context of the key retrieval request to the profile comprises determining that a user account associated with the key retrieval request typically requests an individual key from a specific IP address, and wherein the key retrieval request received from an unrecognized IP address is deemed suspicious when the key retrieval request is not from the specific IP address.

Example 17

The processing system of Example 15, wherein the comparison of the context of the key retrieval request to the profile comprises determining whether a source of permissions provided by a user when requesting a key matches a source of permissions associated with the user as indicated by the profile.

Example 18

The processing system of Example 17, wherein the source of permissions provided by the user comprises individual permissions, and wherein the source of permissions associated with the user as indicated by the profile comprises group permissions.

Example 19

The processing system of Example 14, wherein the executable cloud resource exfiltrates data or modifies data as it is stored by a cloud service provider.

Example 20

The processing system of Example 14, wherein determining that the request to create the executable cloud resource correlates with one of the pool of suspicious key retrieval requests by identifying one of the pool of suspicious key retrieval requests that has a same username and a same subscription identifier as the request to create the executable cloud resource.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A method comprising:
  receiving a key retrieval request;
  determining that an anomaly score of the key retrieval request exceeds a suspicion threshold;
  adding the key retrieval request to a pool of suspicious key retrieval requests;
  returning a key in response to determining that the anomaly score of the key retrieval request exceeds the suspicion threshold, wherein the key enables access to a plurality of cloud resources;
  receiving a request to create an executable cloud resource, wherein the request to create the executable cloud resource includes the key;
  determining that the request to create the executable cloud resource correlates with one of the pool of suspicious key retrieval requests; and
  suspending the request to create the executable cloud resource.
2. The method of claim 1, wherein the key retrieval request is made from a compromised user account, and wherein a key returned by the key retrieval request grants permission for a rogue cloud resource to be surreptitiously created.

3. The method of claim 1, wherein the key returned by the key retrieval request grants permission to create an event that calls a malicious executable cloud resource in response to an action taken by an existing cloud resource.

4. The method of claim 3, wherein the action taken by the existing cloud resource comprises a creation, a modification, or a deletion of an entry in a cloud database.

5. The method of claim 1, further comprising:
receiving a data retrieval request that includes the key; and
allowing the data retrieval request to be performed.

6. The method of claim 1, wherein the key retrieval request and the request to create the executable cloud resource are determined to be correlated based on being made by a same user from a same cloud subscription.

7. The method of claim 1, further comprising:
generating a profile of cloud resource interactions made by a user; and
computing the anomaly score based on a comparison of a context of the key retrieval request with the profile of cloud resource interactions.

8. A computer-readable storage medium having computer-executable instructions stored thereupon that, when executed by a processing system, cause the processing system to:
receive a key retrieval request;
determine that an anomaly score of the key retrieval request exceeds a suspicion threshold;
add the key retrieval request to a pool of suspicious key retrieval requests;
return a cloud access key in response to determining that the anomaly score of the key retrieval request exceeds the suspicion threshold, wherein the cloud access key enables access to a plurality of cloud resources;
receive a request to create an executable cloud resource, wherein the request to create the executable cloud resource includes the cloud access key;
determine that the request to create the executable cloud resource correlates with one of the pool of suspicious key retrieval requests; and
suspend the request to create the executable cloud resource.

9. The computer-readable storage medium of claim 8, wherein the executable cloud resource comprises a serverless function cloud resource or code that executes on a virtual machine cloud resource.

10. The computer-readable storage medium of claim 8, wherein the executable cloud resource is assigned an internet protocol (IP) address from a range of IP addresses associated with a cloud service provider that receives the key retrieval request and that receives the request to create the executable cloud resource.

11. The computer-readable storage medium of claim 8, wherein a sub-resource of the executable cloud resource connects the executable cloud resource to a target cloud resource, and wherein a request to create the sub-resource is suspended based on a determination that the request to create the sub-resource correlates with one of the pool of suspicious key retrieval requests.

12. The computer-readable storage medium of claim 8, wherein the computer-executable instructions further cause the processing system to:
generate a profile of cloud resource interactions made by a user; and
compute the anomaly score based on a comparison of a context of the key retrieval request with the profile of cloud resource interactions.

13. The computer-readable storage medium of claim 12, wherein the profile of cloud resource interactions is generated based on an originating IP address, a geographical location, a username, a type of authentication used to authenticate an individual user, a time of day, or whether permission to access a cloud resource was granted to an individual user or is derived from membership of the individual user in a group of users that has been granted permission.

14. A processing system, comprising:
a processor; and
a computer-readable storage medium having computer-executable instructions stored thereupon that, when executed by the processing system, cause the processing system to:
receive a key retrieval request;
determine that an anomaly score of the key retrieval request exceeds a suspicion threshold;
add the key retrieval request to a pool of suspicious key retrieval requests;
return a key in response to determining that the anomaly score of the key retrieval request exceeds the suspicion threshold, wherein the key enables access to individual cloud resources;
receive a request to create an executable cloud resource, wherein the key enables access to a plurality of cloud resources;
determine that the request to create the executable cloud resource correlates with one of the pool of suspicious key retrieval requests; and
suspend the request to create the executable cloud resource.

15. The processing system of claim 14, wherein the computer-executable instructions further cause the processing system to:
generate a profile of cloud resource interactions made by a user; and
compute the anomaly score based on a comparison of a context of the key retrieval request with the profile of cloud resource interactions.

16. The processing system of claim 15, wherein the comparison of the context of the key retrieval request to the profile comprises determining that a user account associated with the key retrieval request typically requests an individual key from a specific IP address, and wherein the key retrieval request received from an unrecognized IP address is deemed suspicious when the key retrieval request is not from the specific IP address.

17. The processing system of claim 15, wherein the comparison of the context of the key retrieval request to the profile comprises determining whether a source of permissions provided by a user when requesting a key matches a source of permissions associated with the user as indicated by the profile, wherein the sources of permissions indicate whether the user received access rights from individual assignment or group membership.

18. The processing system of claim 17, wherein the source of permissions provided by the user comprises individual permissions, and wherein the source of permissions associated with the user as indicated by the profile comprises group permissions.

19. The processing system of claim 14, wherein the executable cloud resource exfiltrates data or modifies data as it is stored by a cloud service provider.

20. The processing system of claim 14, wherein determining that the request to create the executable cloud resource correlates with one of the pool of suspicious key retrieval requests by identifying one of the pool of suspicious key retrieval requests that has a same username and a same subscription identifier as the request to create the executable cloud resource.

\* \* \* \* \*